(12) United States Patent
Kapinos et al.

(10) Patent No.: US 11,916,978 B2
(45) Date of Patent: Feb. 27, 2024

(54) AUTOMATICALLY ANSWERING COMMUNICATION SESSIONS RECEIVED FROM TRUSTED CALLERS

(71) Applicant: Lenovo (Singapore) Pte. Ltd., New Tech Park (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/530,807

(22) Filed: Nov. 19, 2021

(65) Prior Publication Data

US 2023/0164199 A1 May 25, 2023

(51) Int. Cl.
*H04L 65/1096* (2022.01)
*H04L 65/1076* (2022.01)
*H04L 67/306* (2022.01)
*H04L 9/08* (2006.01)
*H04L 65/403* (2022.01)

(52) U.S. Cl.
CPC ........ *H04L 65/1096* (2013.01); *H04L 9/0894* (2013.01); *H04L 65/1076* (2013.01); *H04L 65/403* (2013.01); *H04L 67/306* (2013.01); *H04L 2209/34* (2013.01)

(58) Field of Classification Search
CPC ............... H04L 65/1096; H04L 9/0894; H04L 65/1076; H04L 65/403; H04L 67/306; H04L 2209/34

USPC ......................................................... 709/204
See application file for complete search history.

(56) References Cited

U.S. PATENT DOCUMENTS

| 5,995,603 | A * | 11/1999 | Anderson | H04M 1/663 |
| | | | | 379/142.04 |
| 6,721,059 | B1 * | 4/2004 | Sturgeon | H04N 1/32016 |
| | | | | 358/1.15 |
| 10,149,156 | B1 * | 12/2018 | Tiku | H04W 12/66 |
| 2002/0015484 | A1 * | 2/2002 | Maeng | H04M 1/663 |
| | | | | 379/142.1 |
| 2003/0048880 | A1 * | 3/2003 | Horvath | H04M 3/436 |
| | | | | 379/88.01 |
| 2004/0057578 | A1 * | 3/2004 | Brewer | H04B 1/385 |
| | | | | 379/433.1 |

(Continued)

*Primary Examiner* — Nicholas R Taylor
*Assistant Examiner* — Chong G Kim
(74) *Attorney, Agent, or Firm* — Kunzler Bean & Adamson

(57) ABSTRACT

Methods, systems, apparatus, and computer program products that can automatically answer communication sessions received from trusted callers are disclosed herein. One method includes maintaining, by a processor of an information handling device, a list of trusted callers encoded in a memory and automatically answering a communication session received by the information handling device from a trusted caller in the encoded list of trusted callers without receiving input from a user of the information handling device accepting the communication session on the information handling device. Systems, apparatus, and computer program products that include hardware and/or software that can perform the methods for automatically answering communication sessions received from trusted callers are also disclosed herein.

20 Claims, 17 Drawing Sheets

(56) References Cited

U.S. PATENT DOCUMENTS

| | | | | |
|---|---|---|---|---|
| 2004/0096046 | A1* | 5/2004 | Lection | H04M 15/06 379/211.01 |
| 2006/0182029 | A1* | 8/2006 | Kealy | H04M 15/8088 370/352 |
| 2007/0036296 | A1* | 2/2007 | Flanagan | H04L 63/0428 379/88.19 |
| 2009/0143013 | A1* | 6/2009 | Hatano | H04M 1/57 455/41.3 |
| 2010/0128863 | A1* | 5/2010 | Krum | H04M 1/663 379/207.02 |
| 2010/0319063 | A1* | 12/2010 | Koppolu | H04L 65/1104 709/227 |
| 2011/0211572 | A1* | 9/2011 | Campion | H04L 12/66 379/142.04 |
| 2014/0192965 | A1* | 7/2014 | Almeida | H04M 3/2281 379/70 |
| 2020/0195776 | A1* | 6/2020 | Harrison | H04M 7/0036 |
| 2021/0306454 | A1* | 9/2021 | Gruhl | H04L 9/0825 |

* cited by examiner

AUTOMATICALLY ANSWERING COMMUNICATION SESSIONS RECEIVED FROM TRUSTED CALLERS

FIELD

The subject matter disclosed herein relates to computing devices and more particularly relates to automatically answering communication sessions received from trusted callers.

BACKGROUND

Some individuals (e.g., non-technology savvy individuals) can have a difficult time accepting communication sessions because contemporary computing devices do not provide a simplified way for individuals to accept communication sessions. As such, at least some individuals may miss communication sessions received on their computing device that they want to accept.

BRIEF SUMMARY

Apparatus, methods, systems, and program products that can automatically answer communication sessions received from trusted callers are disclosed herein. An apparatus, in one embodiment, includes a processor and a memory that stores code executable by the processor. In certain embodiments, the code is executable by the processor to maintain a list of trusted callers that is encoded in the memory and automatically answer a communication session received from a trusted caller in the encoded list of trusted callers without receiving input from a user accepting the communication session.

One embodiment of a method that can automatically answer communication sessions received from trusted callers includes maintaining, by a processor of an information handling device, a list of trusted callers encoded in a memory. In some embodiments, the method further includes automatically answering a communication session received by the information handling device from a trusted caller in the encoded list of trusted callers without receiving input from a user of the information handling device accepting the communication session on the information handling device.

A computer program product, in one embodiment, includes a computer-readable storage medium including program instructions embodied therewith. In certain embodiments, the program instructions are executable by a processor to cause the processor to maintain a list of trusted callers encoded in a memory of an information handling device. In certain embodiments, the executable program instructions further cause the processor to automatically answer a communication session received by the information handling device from a trusted caller in the encoded list of trusted callers without receiving input from a user of the information handling device accepting the communication session on the information handling device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
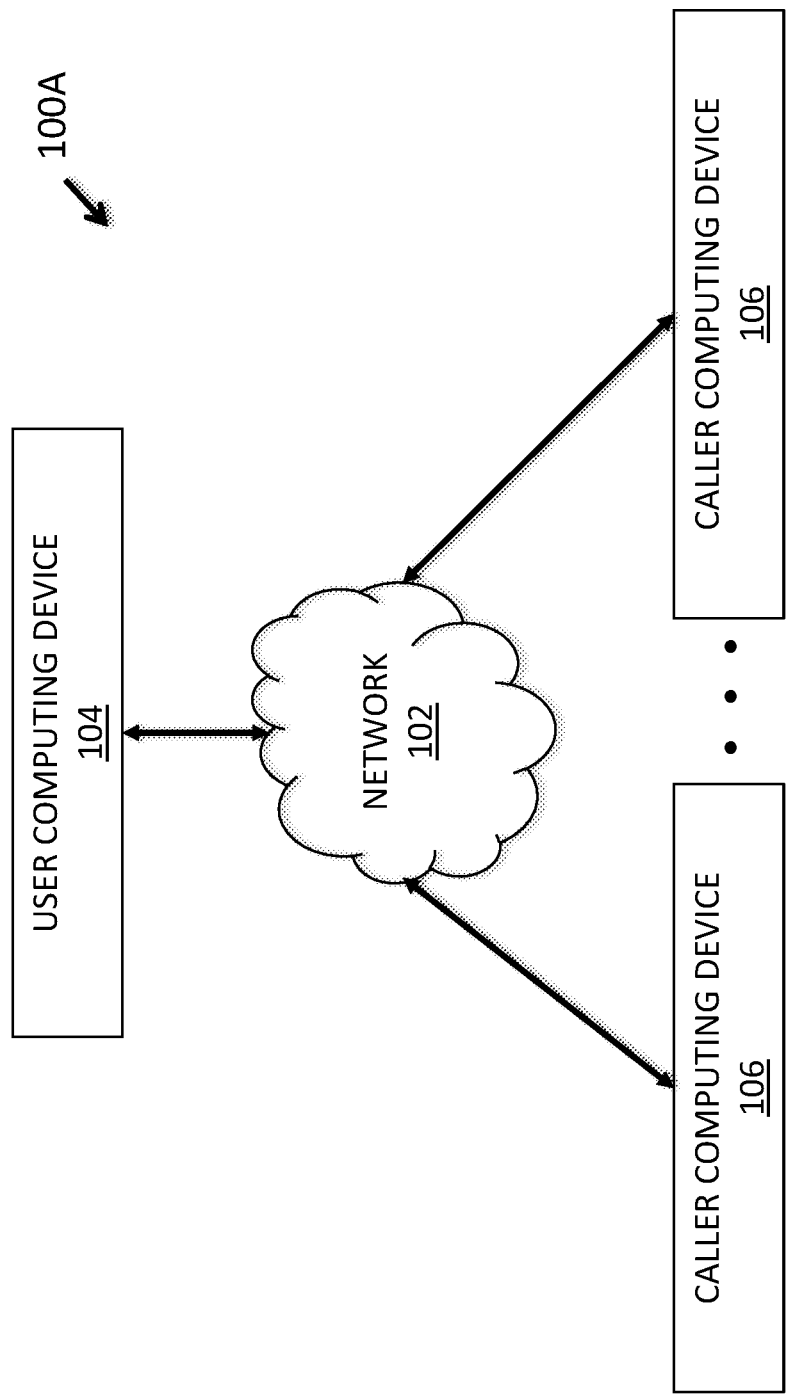
FIGS. 1A and 1B are schematic block diagrams illustrating various embodiments of a system that can automatically answer communication sessions received from trusted callers.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The various embodiments disclosed herein provide apparatus, methods, systems, and program products that can automatically answer communication sessions received from trusted callers are disclosed herein. An apparatus, in one embodiment, includes a processor and a memory that stores code executable by the processor. In certain embodiments, the code is executable by the processor to maintain a list of trusted callers that is encoded in the memory and automatically answer a communication session received from a trusted caller in the encoded list of trusted callers without receiving input from a user accepting the communication session.

One embodiment of a method that can automatically answer communication sessions received from trusted callers includes maintaining, by a processor of an information handling device, a list of trusted callers encoded in a memory. In some embodiments, the method further includes automatically answering a communication session received by the information handling device from a trusted caller in the encoded list of trusted callers without receiving input from a user of the information handling device accepting the communication session on the information handling device.

A computer program product, in one embodiment, includes a computer-readable storage medium including program instructions embodied therewith. In certain embodiments, the program instructions are executable by a processor to cause the processor to maintain a list of trusted callers encoded in a memory of an information handling device. In certain embodiments, the executable program instructions further cause the processor to automatically answer a communication session received by the information handling device from a trusted caller in the encoded list of trusted callers without receiving input from a user of the information handling device accepting the communication session on the information handling device.

With reference to the drawings, FIG. 1A is a schematic block diagram of one embodiment of a computing system 100A (and/or computing network 100A) that can automatically answer communication sessions received from trusted callers. At least in the illustrated embodiment, the computing system 100A includes, among other components, a network 102 connecting a user computing device 104 and a set of caller computing devices 106 (also simply referred individually, in various groups, or collectively as caller computing device(s) 106) to one another.

Figure 1B:
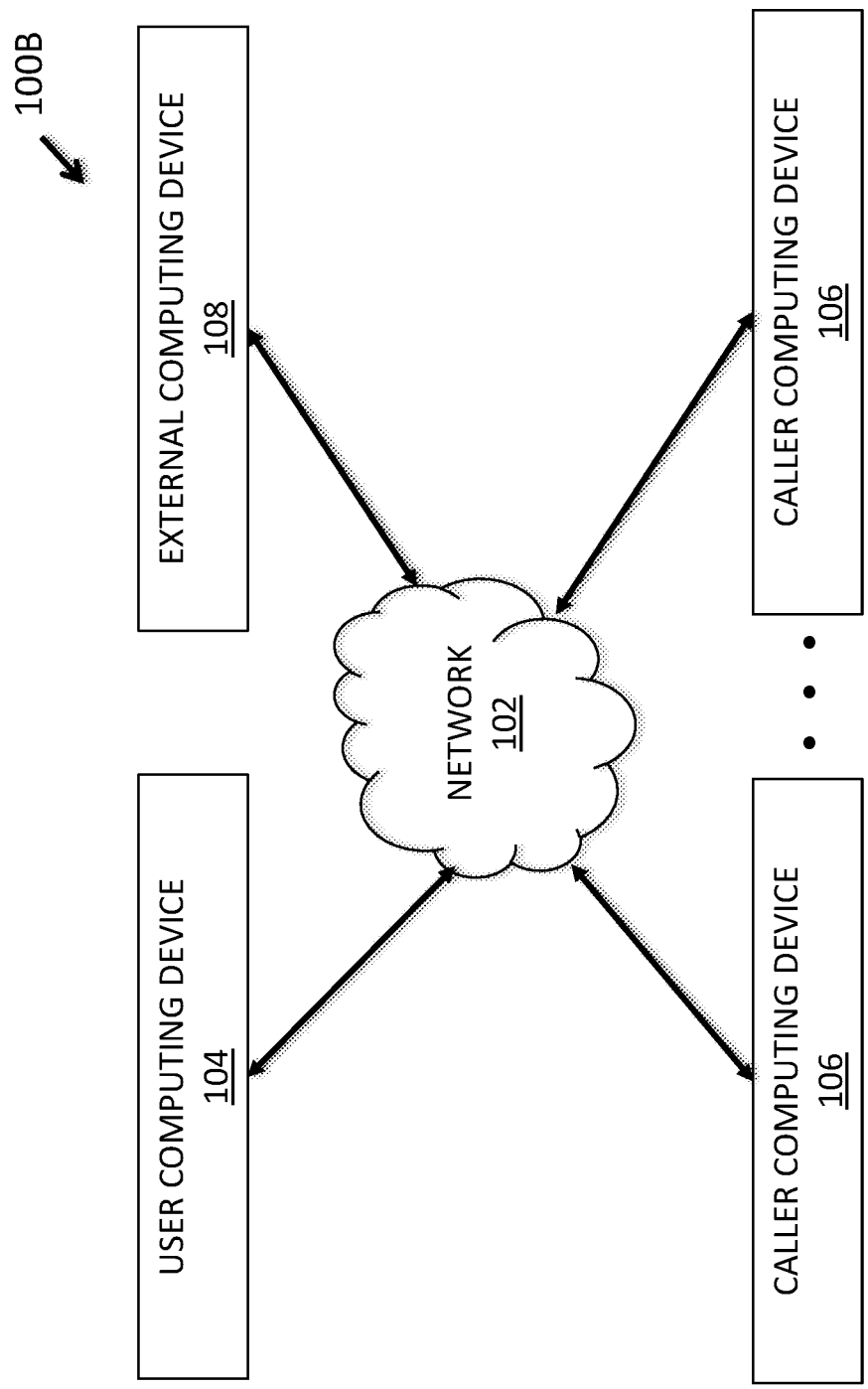

Referring to FIG. 1B, FIG. 1B is a schematic block diagram of another embodiment of a computing system 100B (and/or computing network 100B) that can automatically answer communication sessions received from trusted callers. At least in the illustrated embodiment, the computing system 100B includes, among other components, a network 102 connecting a user computing device 104 and a set of caller computing devices 106 to one another similar to the user computing device 100A. In addition, the user computing device 100B includes an external computing device 108 coupled to and/or in communication with the user computing device 104 via the network 102.

A network 102 may include any suitable wired and/or wireless network (e.g., public and/or private computer networks in any number and/or configuration (e.g., the Internet, an intranet, a cloud network, etc.)) that is known or developed in the future that enables the user computing device 104 and the set of caller computing devices 106 to be coupled to and/or in communication with one another and/or to share resources. In various embodiments, the network 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/ or or sets of computing devices connected together for the purpose of communicating (e.g., video conferencing) with one another that are possible and contemplated herein.

A user computing device 104 may include any suitable computing system and/or computing device that is known or developed in the future capable of accessing and/or communicating with the set of caller computing devices 106 (e.g., one or more caller computing devices 106) via the network 102 and, for the computing system 100B, capable of accessing and/or communicating with the external computing device 108 via the network 102. Examples of a user computing device 104 include, but are not limited to, a laptop computer, a desktop computer, a personal digital assistant (PDA), a tablet computer, a smart phone, a cellular telephone, a smart television (e.g., televisions connected to the Internet), a wearable device, an Internet of Things (IoT) device, a game console, a vehicle on-board computer, a streaming device, and a smart device, etc., among other computing devices that are possible and contemplated herein, which can be referred to generally as, an information handling device.

Figure 2A:
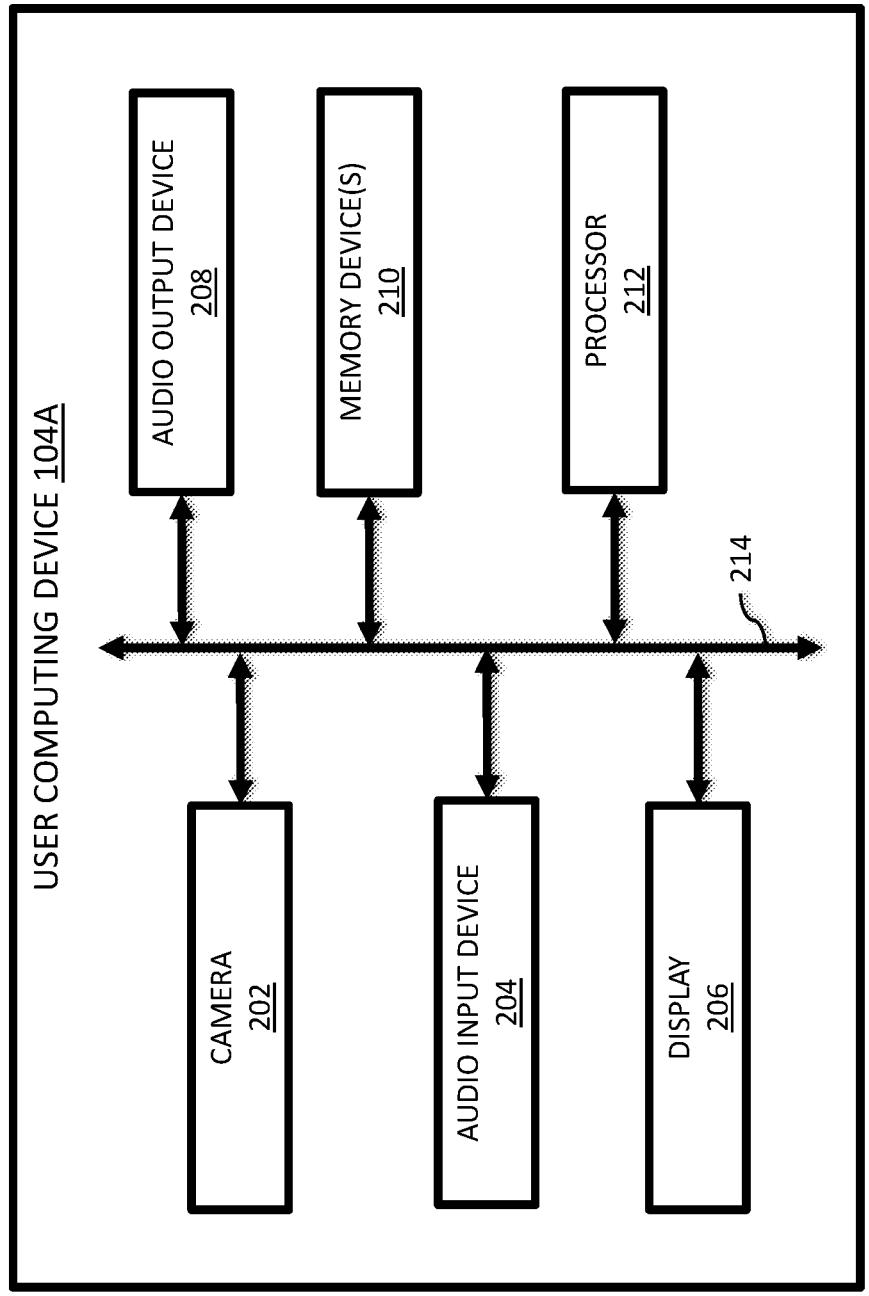
FIGS. 2A and 2B are schematic block diagrams illustrating various embodiments of a user computing device included in the systems of FIGS. 1A and 1B.

With reference to FIG. 2A, FIG. 2A is a block diagram of one embodiment of a user computing device 104A. At least in the embodiment illustrated in FIG. 2A, the user computing device 104A includes, among other components, a camera 202, an audio input device 204, a display 206, an audio output device 208, one or more memory devices 210, and a processor 212 coupled to and/or in communication with one another via a bus 214 (e.g., a wired and/or wireless bus).

Figure 2B:
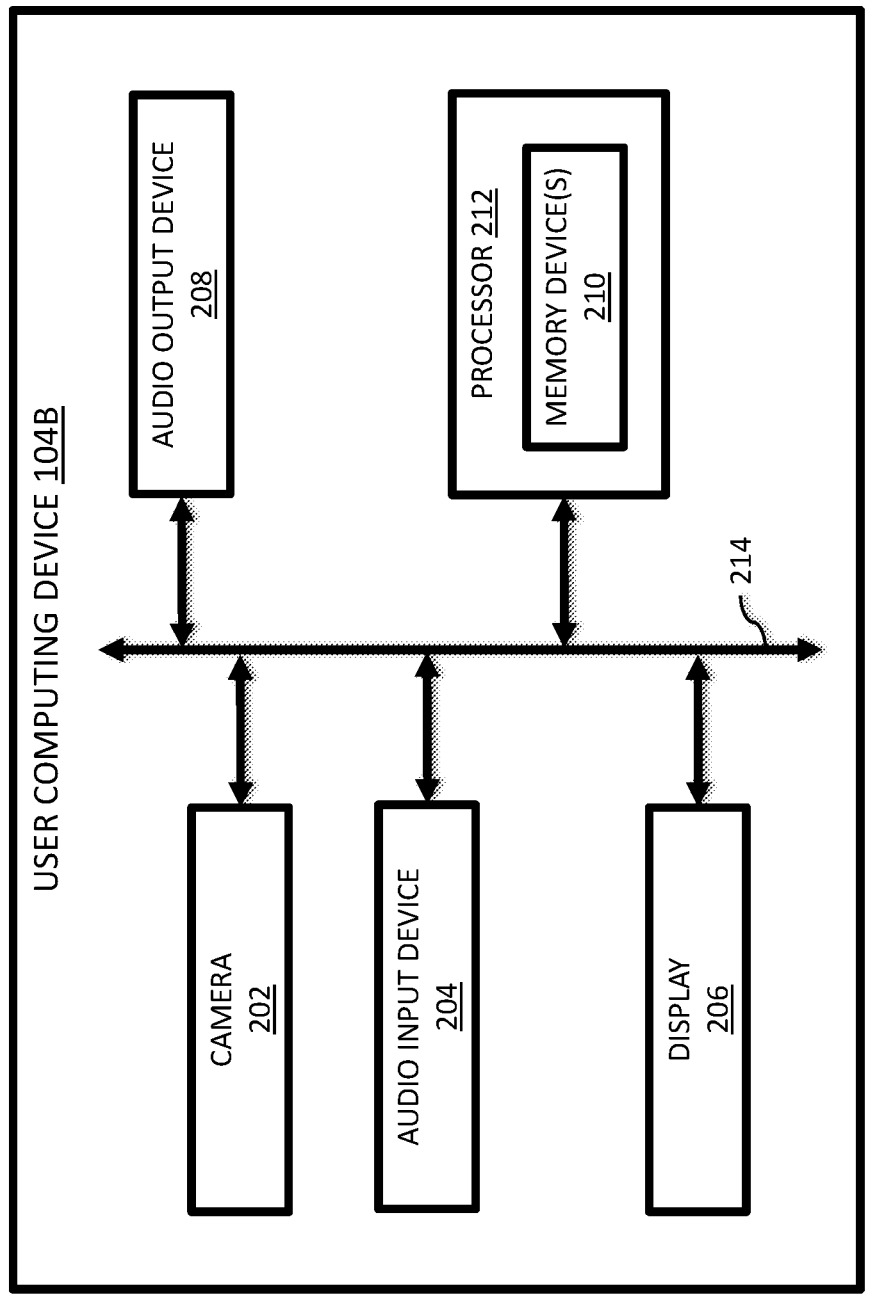

Referring to FIG. 2B, FIG. 2B is a block diagram of another embodiment of a user computing device 104B. At least in the embodiment illustrated in FIG. 2B, the user computing device 104B includes, among other components, a camera 202, an audio input device 204, a display 206, an audio output device 208, and a processor 212 that includes one or more memory devices 210 coupled to and/or in communication with one another via a bus 214. Alternative to the user computing device 104A, the processor 212 in the user computing device 104B includes the memory device(s) 210 in the processor 212, whereas the memory device(s) 210 of the user computing device 104A is/are separate and/or independent of the processor 212.

A camera 202 may include any suitable device that is known or developed in the future capable of capturing and transmitting images, video feeds, and/or video streams. In various embodiments, the camera 202 includes at least one video camera.

An audio input device 204 may include any suitable device that is known or developed in the future capable of capturing and transmitting audio/sounds, audio feeds, and/or audio streams. In various embodiments, the audio input device 204 includes at least one microphone.

A display 206 may include any suitable device that is known or developed in the future capable of displaying images, video feeds, and/or video streams. In various embodiments, the display 206 may include an internal display or an external display.

An audio output device 208 may include any suitable device that is known or developed in the future capable of receiving and providing audio/sound, audio feeds, and/or audio streams. In various embodiments, the audio output device 204 includes a speaker, a set of headphones, or a set of earbuds, etc., among other suitable audio output devices that are possible and contemplated herein.

A set of memory devices 210 may include any suitable quantity of memory devices 210. Further, a memory device 210 may include any suitable type of device and/or system that is known or developed in the future that can store computer-useable and/or computer-readable code. In various embodiments, a memory device 210 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 212).

A memory device 210, in some embodiments, includes volatile computer storage media. For example, a memory device 210 may include random access memory (RAM), including dynamic RAM (DRAM), synchronous dynamic RAM (SDRAM), and/or static RAM (SRAM). In other embodiments, a memory device 210 includes non-volatile computer storage media. For example, a memory device 210 may include a hard disk drive, a flash memory, and/or any other suitable non-volatile computer storage device that is known or developed in the future. In various embodiments, a memory device 210 includes both volatile and non-volatile computer storage media.

Figure 3A:
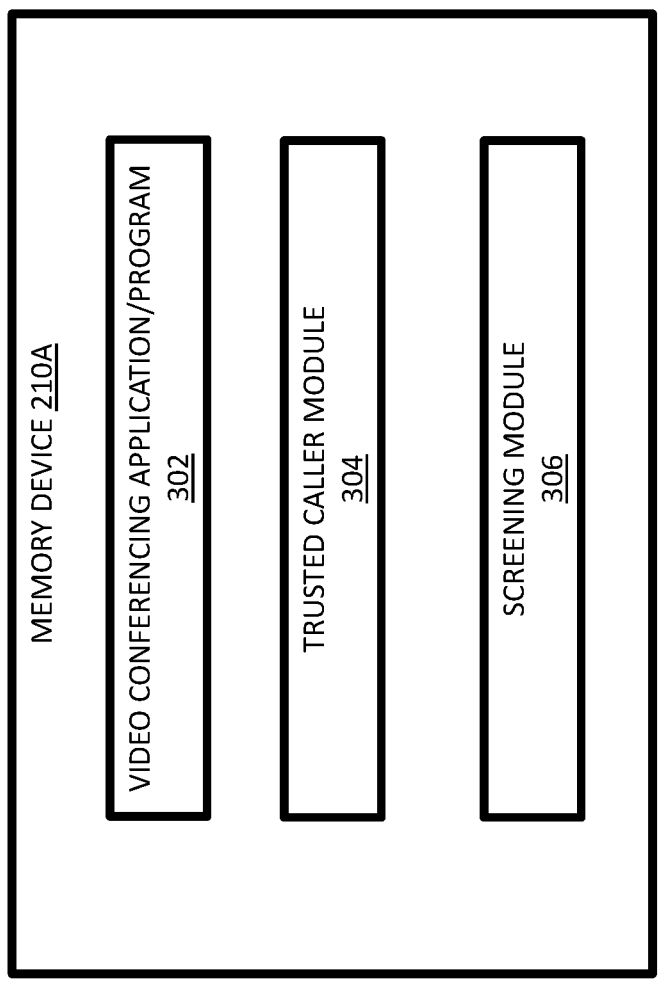
FIGS. 3A and 3B are schematic block diagrams illustrating various embodiments of a memory device included in the user computing devices of FIGS. 2A and 2B.

With reference now to FIG. 3A, FIG. 3A is a schematic block diagram of one embodiment of a memory device 210A. At least in the illustrated embodiment, the memory device 210A includes, among other components, a video conferencing program/application 302, a trusted caller module 304, and a screening module 306 that are each configured to operate/function in conjunction with one another when executed by the processor 212 to automatically answer communication sessions (e.g., video calls, audio calls, etc.) received from trusted callers.

A video conferencing program/application 302 may include any suitable commercial and/or private video conferencing program and/or application that is known or developed in the future capable of enabling communication between a user computing device 104A or a user computing device 104B (also simply referred individually, in various groups, or collectively as user computing device(s) 104) and the caller computing device(s) 106. Examples of a video conferencing program/application 302 include, but are not limited to, Microsoft Teams®, Zoom®, Google Meet®, Cisco Webex®, GoToMeeting®, Skype®, etc., among other video conferencing programs/applications that are possible and contemplated herein.

In various embodiments, a video conferencing program/application 302 is configured to utilize the camera 202 and the audio input device 204 to capture one or more images and one or more audios/sounds, respectively, and generate a video feed and/or video stream that includes the captured video/image(s) and audio/sound(s) or the audio/sound(s). The video conferencing program/application 302 is further configured to transmit the video feed/stream or audio/sound(s) to one or more caller computing devices 106.

In various additional or alternative embodiments, the video conferencing program/application 302 is further configured to receive video feeds/streams (e.g., video and/or one or more visual images and audio/sound(s)) from one or more caller computing devices 106. In some embodiments, the video conferencing program/application 302 is configured to utilize the display 206 and the audio output device 208 to display the video stream and/or one or more visual images and play the audio/sound(s), respectively, in received video calls (e.g., audiovisual calls) that can be automatically accepted by a user computing device 104.

In certain additional or alternative embodiments, the video conferencing program/application 302 is configured to receive audio feeds and/or audio streams (e.g., audio/sound(s)) from one or more caller computing devices 106. Here, the video conferencing program/application 302 is configured to utilize the audio output device 208 to play the audio/sound(s) in received audio calls (e.g., audio feeds and/or audio streams that do not include any video and visual images) that can be automatically accepted by a user computing device 104.

A trusted caller module 304 may include any suitable hardware and/or software that can maintain and/or manage a list of trusted callers for a user computing device 104. The list of trusted callers, in certain embodiments, is encoded in one or more memory devices 210 of a user computing device 104. Encoding the list of trusted callers on the memory device(s) 210 can assist in ensuring that the list of trusted callers is not easily changed by unauthorized third parties.

In various embodiments (see, e.g., system 100A) the list of trusted callers is encoded in the memory device(s) 210 prior to an initial use of the user computing device 104 by the user (e.g., an end user). In some embodiments, the list of trusted callers is encoded in the memory device(s) 210 as part of an automated pre-configuration process performed on the user computing device 104 at a time prior to the initial use of the user computing device 104 by the end user, which time prior to the initial user by the end user can be during a manufacturing process of the user computing device 104, a time during the sales process of the user computing device 104, a time during a set-up process of the user computing device 104, and/or the like time(s). That is, in certain embodiments, the pre-configuration process that encodes the list of trusted callers in the memory device(s) 210 can occur before the end user receives and/or initially uses the user computing device 104.

In additional or alternative embodiments (see, e.g., system 100B), the list of trusted callers is not pre-encoded in the memory device(s) 210 of a user computing device 104 prior to the initial use of the user computing device 104 by the end user. In certain embodiments, the list of trusted callers is encoded in the memory device(s) 210 of a user computing device 104 as part of a manual pre-configuration process performed by a user (e.g., an end user) after the end user receives the user computing device 104 and logs in to begin using the user computing device 104. Here, as part of the manual pre-configuration process in some embodiments subsequent to logging in, the end user can prompt the trusted caller module 304 to retrieve (e.g., in a read file) the list of trusted callers from the external computing device 108 (see, e.g., the system 100B) and, upon receipt of the list of trusted callers (e.g., in the read file) from the external computing device 108, the trusted caller module 304 can encode the retrieved list of trusted callers in the memory device(s) 210 in the user computing device 104, as further discussed elsewhere herein.

In some embodiments, the trusted caller module 304 maintains the list of trusted callers on an external computing device 108. In certain embodiments, the trusted caller module 304 maintains the list of trusted callers on the external computing device 108 in addition to in the memory device(s) 210 on the user computing device 104.

A list of trusted callers may include any suitable quantity of trusted callers. In some embodiments, the list of trusted callers includes one or more pre-set quantities of trusted callers, which can be any suitable quantity of trusted callers and may also include a pre-set minimum quantity and/or a pre-set maximum quantity of trusted callers. At times, a list of trusted callers may include zero trusted callers; however, it is preferable that the list of trusted callers includes at least one trusted caller.

A trusted caller, in various embodiments, in the list of trusted callers identifies a caller computing device 106 that is recognized by the user computing device 104 (and/or the user of the user computing device 104) and/or is pre-authorized by the user computing device 104 (and/or the user of the user computing device 104) to communicate with the user computing device 104. Here, a caller computing device 106 that is identified and/or labeled as a trusted caller is typically associated with a user of the caller computing device 106 that has a relationship (e.g., family member, friend, associate, colleague, partner, etc.) with the user of the user computing device 104 and can be referred to herein as, a trusted caller computing device 106 and/or an authorized caller computing device 106. In various embodiments of the systems 100A and/or 100B, one or more of the caller computing devices 106 can be identified/labeled as a trusted caller computing device 106 included in the list of trusted callers encoded in the memory device(s) 210.

A caller computing device 106 may be identified and/or labeled as a trusted caller computing device 106 in the list of trusted callers using any suitable technique and/or identifier that is known or developed in the future. In various embodiments, A caller computing device 106 may be identified and/or labeled as a trusted caller computing device 106 in the list of trusted callers using a device serial number, a digital signature, a phone number, an email address, a device identification (device ID), a user identification (user ID), a social media identification (social media ID), an account identification (account ID), and/or an account number, etc., among other identifiers that are possible and contemplated herein.

In various embodiments, the trusted caller module 304 is configured to allow and/or enable the screening module 306 to access and/or use the list of trusted callers maintained by the trusted caller module 304. In addition, the screening module 306 is configured to access and/or use the list of trusted callers maintained by the trusted caller module 304.

A screening module 306 may include any suitable hardware and/or software that can screen communication sessions received from caller computing devices 106. In various embodiments, the screening module 306 is configured to accept or reject communication sessions received by a user computing device 104 from caller computing devices 106.

In some embodiments, the screening module 306 is configured to identify and/or determine whether a caller computing device 106 that is attempting to initiate a communication session (e.g., a video call, an audio call, etc.) with the user computing device 104 is on the list of trusted users maintained by the trusted user module 304 in response to the user computing device 104 receiving a communication session request from the caller computing device 106. In certain embodiments, the communication session request received from a caller computing device 106 attempting to initiate a communication session with the user computing device 104 includes one or more identifiers for the caller computing device 106 and/or the user of the caller computing device 106 and the screening module 306 is configured to compare the identifier(s) in the communication session request to the identifier(s) for each trusted caller (e.g., each trusted caller computing device 106) in the list of trusted callers to determine if there is a match.

In response to one or more identifiers for the caller computing device 106 and/or the user of the caller computing device 106 attempting to initiate the communication session (e.g., via the communication session request) with the user computing device 104 matching one or more of the identifiers associated with a trusted caller in the list of trusted callers, the screening module 306 is configured to determine that the caller computing device 106 and/or the user of the caller computing device 106 is a trusted caller computing device 106 and/or trusted caller and automatically accept the communication session from the trusted caller computing device 106.

In various embodiments, the screening module 306 is configured to automatically accept a communication session from a trusted caller computing device 106 and/or trusted caller without the user of the user computing device 104 having to accept the communication session. That is, the screening module 306 is configured to automatically accept communication sessions from trusted caller computing devices 106 and/or trusted callers without the user of the user computing device 104 having to do anything. In other words, the screening module 306 is configured to automatically accept a communication session from a trusted caller computing device 106 and/or trusted caller without the user of the user computing device 104 accepting (e.g., affirmatively accepting or otherwise accepting) the communication session and/or receiving any type of input (e.g., an accept input) from the user of the user computing device 104. By automatically accepting communication sessions initiated by and/or received from trusted caller computing devices 106 and/or trusted callers, the screening module 306 can ensure and/or facilitate ensuring that communication sessions initiated by and/or received from trusted caller computing devices 106 and/or trusted callers are not missed by the user of the user computing device 104.

In some embodiments, a trusted caller computing device 106 and/or a user of a trusted computing device 106 may receive special treatment compared to caller computing devices 106 and/or users of computing devices 106 not one the list of trusted callers. The special treatment may include any suitable enhanced feature(s) to a communication session that known or developed in the future. For example, an enhanced feature may include video calls for trusted callers and auditory calls for any caller not identified as a trusted caller on the list of trusted callers, higher bandwidths (e.g., 3G/4G vs. 5G) for trusted callers, and/or higher video resolution, etc., among other enhancements that are possible and contemplated herein.

At times, the user of the user computing device 104 may be unavailable when a communication session initiated by and/or received from a trusted caller computing device 106 and/or trusted caller is automatically accepted by the screening module 306. In some embodiments, the screening module 306 is configured to monitor (e.g., visually monitor (via a camera 202) and/or audibly monitor (e.g., via an audio input device 204)) the environment surrounding the user computing device 104 for a predetermined amount of time to determine whether the user of the user computing device 104 is present and/or available to conduct the communication session, which predetermined amount of time may be any suitable amount of time. The screening module 306 can determine whether the user of the user computing device 104 is present and/or available to conduct the communication session in response to the user visually and/or audibly interacting with and/or responding to the communication session.

In response to the user of the user computing device 104 visually and/or audibly interacting with and/or responding to the communication session within the predetermined amount of time, the screening module 306 determines that the user of the user computing device 104 is present and/or available and allows the communication session to continue (e.g., a final automatic acceptance). In response to the user of the user computing device 104 not visually and/or not audibly interacting with and/or responding to the communication session within the predetermined amount of time, the screening module 306 determines that the user of the user computing device 104 is not present and/or is unavailable available and terminates the communication session that was automatically accepted.

In response to one or more identifiers for the caller computing device 106 and/or the user of the caller computing device 106 attempting to initiate the communication session (e.g., via the communication session request) with the user computing device 104 not matching any of the identifiers associated with a trusted caller in the list of trusted callers, the screening module 306, in various embodiments, is configured to determine that the caller computing device 106 and/or the user of the caller computing device 106 is a not trusted caller computing device 106 (untrusted caller computing device 106) and/or not a trusted caller (e.g., an untrusted caller) and does not automatically accept the communication session from the untrusted caller computing device 106. In additional or alternative embodiments, the screening module 306 is configured to automatically reject a communication session in response to determining that the caller computing device 106 and/or the user of the caller computing device 106 is an untrusted caller computing device 106 and/or an untrusted caller. In some embodiments, in response to determining that a caller computing device 106 and/or a user of a caller computing device 106 is an untrusted caller computing device 106 and/or an untrusted caller, the screening module 306 is configured to treat a communication session initiated by and/or received from the untrusted caller computing device 106 and/or untrusted caller similar to a standard communication session request in which the user of the user computing device 104 manually and/or affirmatively accepts the communication session by a user input (e.g., a accept input).

In some embodiments, a caller computing device 106 and/or a user of a caller computing device 106 may be on the list of trusted callers and identified as a less trusted caller computing device 106 and/or a less trusted caller. In some embodiments, a communication session initiated by and/or received from a less trusted caller computing device 106 and/or a less trusted caller may not be automatically rejected by the screening module 106 and forwarded to the user of the user computing device 102 for manual acceptance/rejection, whereas a communication session initiated by and/or received from an untrusted caller computing device 106 and/or an untrusted caller may be automatically rejected. In this matter, a communication session initiated by and/or received from a less trusted caller computing device 106 and/or less trusted caller may be considered as being semi-automatically answered.

In certain embodiments, a caller computing device 106 and/or a user of a caller computing device 106 may not be on the list of trusted callers but may appear in the communication session log of the user computing device 104. Here, the screening module 306 may be configured to identify a caller computing device 106 and/or a user of the caller computing device 106 in the communication session log of the user computing device 104 and identify the caller computing device 106 and/or the user of the caller computing device 106 as a less trusted caller computing device 106 and/or a less trusted caller. In some embodiments, a communication session initiated by and/or received from a less trusted caller computing device 106 and/or a less trusted caller may not be automatically rejected by the screening module 106 and forwarded to the user of the user computing device 102 for manual acceptance/rejection, whereas a communication session initiated by and/or received from an untrusted caller computing device 106 and/or an untrusted caller may be automatically rejected. In this matter, a communication session initiated by and/or received from a less trusted caller computing device 106 and/or less trusted caller may be considered as being semi-automatically answered.

Figure 3B:
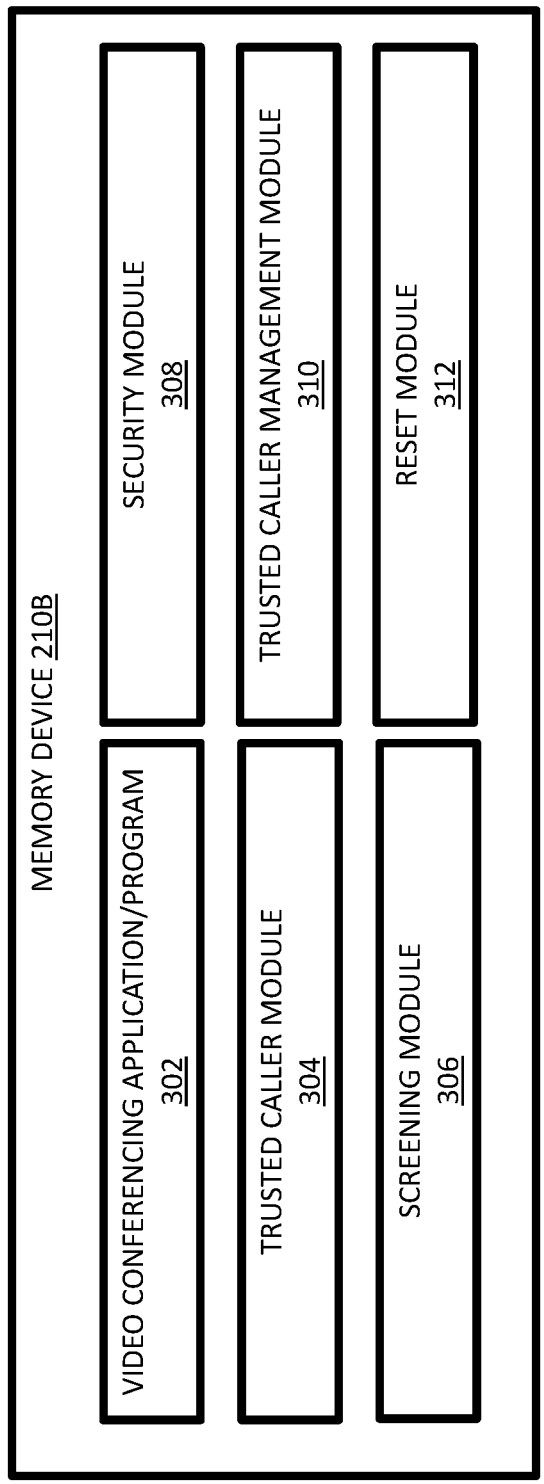

Referring now to FIG. 3B, FIG. 3B is a block diagram of another embodiment of a memory device 210B. The memory device 210B includes a video conference program/application 302, a trusted caller module 304, and a screening module 306 similar to the video conference program/application 302, trusted caller module 304, and screening module 306 included in the memory device 210A discussed elsewhere herein. At least in the embodiment illustrated in FIG. 3B, the memory device 210B further includes, among other components, a security module 308, a trusted caller management module 310, and a reset module 312.

A security module 308 may include any suitable hardware and/or software that can provide security measures and/or facilitate security measures for a list of trusted callers. In various embodiments, the security module 308 is configured to provide security measures and/or facilitate security operations for one or more lists of trusted callers exchanged between the external computing device 108 and the user computing device 104, one or more lists of trusted callers stored on the user computing device 104, and/or one or more lists of trusted callers stored on the external computing device 108.

In various embodiments, the security module 308 is configured to operate in conjunction with the trusted caller module 304 to perform the manual pre-configuration process discussed above with reference to at least some embodiments of the trusted caller module 304 and the system 100B. The security module 308 and the trusted caller module 304, in certain embodiments, is/are configured to retrieve the list of trusted callers from the external computing device 108 during the manual pre-configuration process utilizing a Public Key Infrastructure (PKI) protocol. As at least a portion of the manual pre-configuration process with the PKI protocol, the list of trusted callers on the external computing device 108 is signed with a digital certificate associated with a user computing device 104 and/or a user of the user computing device 104. So that the trusted caller module 304 can retrieve the list of trusted callers during the pre-configuration process, the security module 308 is configured to store a cryptographic key associated with the user computing device 104 and/or the user of the user computing device 104.

The cryptographic key can be utilized by the security module 308 as a way to authenticate the user computing device 104 and/or the user of the user computing device 104 to the external computing device 108 and/or as a way to certify to the external computing device 108 that the user computing device 104 and/or the user of the user computing device 104 is authorized to retrieve the list trusted callers from the external computing device 108 via the trusted caller module 304, as discussed elsewhere herein. As further discussed elsewhere herein, the external computing device 108 can transmit the list of trusted callers to the user computing device 104 and/or the trusted caller module 304 in response to authenticating the user computing device 104 and/or the user of the user computing device 104 for use in the manual pre-configuration process.

In some embodiments, the list of trusted callers on the external computing device 108 is encrypted and the security module 308 on the user computing device 104 includes a decryption key to decrypt the encrypted list of trusted callers on the external computing device 108 as part of the manual pre-configuration process. In this manner, the security module 308, along with the trusted user module 304, can utilize an encrypted transmission to retrieve (e.g., fetch and receive) an encrypted list of trusted callers from the external computing device 108 during the manual pre-configuration process. The security module 308 may then decrypt the encrypted list of trusted callers from the external computing device 108 so that the trusted caller module 304 can maintain a list of trusted callers on the memory device(s) 210.

In some embodiments, the security module 308 includes an encryption key to encrypt/decrypt the list of trusted callers retrieved from the external computing device 108 so that the memory device(s) 210 can store an encrypted list of trusted callers. Further, the security module 308 uses the encryption key to decrypt the list of trusted callers in the memory device(s) 210 in response to the screening module 306 needing to verify that a video call or audio call is received from a trusted caller on the list of trusted callers.

In some embodiments, the security module 308 uses the same encryption key to decrypt the encrypted list of trusted callers retrieved from the external computing device 108 and encrypt/decrypt the list of trusted callers in the memory device(s) 210. In other embodiments, the security module 308 uses one encryption key to decrypt the encrypted list of trusted callers retrieved from the external computing device 108 and a different encryption key to encrypt/decrypt the list of trusted callers in the memory device(s) 210.

In various embodiments, the security module 308 is configured to operate in conjunction with the trusted caller module 304 to perform the automatic pre-configuration process discussed above with reference to at least some embodiments of the trusted caller module 304 and the system 100A. As at least a portion of the automatic pre-configuration process, the list of trusted callers is pre-encoded on the memory device(s) 210 and signed with a digital certificate associated with a user of the user computing device 104. So that the trusted caller module 304 can access the list of trusted callers in the memory device(s) 210 during the pre-configuration process, the security module 308 is configured to store a pre-programmed login secret associated with the user of the user computing device 104 that the security module 308 uses to compare against the digital certificate. Upon the user logging in, the security module 308 is configured to compare the login secret for the user and the digital certificate to determine a match. A match validates and/or authenticates the user and a non-match fails to validate and/or authenticate the user.

In some embodiments, a digest of the list of trusted callers includes the pre-programmed login secret for the user of the user computing device 104. In certain embodiments, the security module 308 is configured to encrypt the login secret for the user of the user computing device 104. The security module 308 can encrypt the login secret for the user of the user computing device 104 using any suitable encryption technique, algorithm, scheme, and/or encryption key that is known or developed in the future that the user computing device 104 and/or security module 308 inherently knows to protect from disclosure.

The automatic pre-configuration process, in some embodiments, includes the list of trusted callers being encrypted in the memory device(s) 210 and the security module 308 includes a pre-shared and/or pre-loaded encryption key for encrypting/decrypting the encrypted list of trusted callers in the memory device(s) 210. In response to a match of the login secret for the user and the digital certificate that validates and/or authenticates the user, the security module 308 is configured to decrypt the encrypted list of trusted callers in the memory device(s) 210 for maintenance by the trusted caller module 304 and use by the screening module 306, as discussed elsewhere herein.

In the various embodiments discussed herein, the security module 308 may encrypt and/or decrypt a trusted caller list using any encryption/decryption technique and/or algorithm that is known or developed in the future capable of encrypting/decrypting data. That is, the various encryption keys discussed herein may include any suitable type of encryption key that is known or developed in the future capable of being used to encrypt/decrypt data.

In some embodiments, one or more of the encryption keys disclosed herein is/are cryptographically tied to the user computing device 104. The encryption key(s) may be cryptographically tied to the user computing device 104 via one or more of the serial number of the user computing device 104, a firmware hash of the user computing device 104, and/or an unforgeable digital signature on the user computing device 104, etc., among other unique identifiers for the user computing device 104 that are possible and contemplated herein. In this manner, a list of trusted callers that is encoded/stored on the user computing device 104 (e.g., the memory device(s) 210) and/or on the external computing device 108 allows/enables the list(s) of trusted callers to be targeted to the user computing device 104 so that impersonation of the user computing device 104 is prevented/preventable or at least substantially prevent/preventable.

In some embodiments, the user computing device 104 and/or the security module 308 is/are equipped with one or more tamper proofing mechanisms and/or anti-spoofing mechanisms so that the various encryption keys in the user computing device 104 and/or the security module 308 are protected and/or not accessible by an unauthorize device, entity, and/or party (e.g., a hacker). The tamper proofing mechanism(s) and/or anti-spoofing mechanism(s) may include any suitable tamper proofing mechanism(s) and/or anti-spoofing mechanism(s) that are known or developed in the future capable of protecting an encryption key from an unauthorize device, entity, and/or party.

A trusted caller management module 310 may include any suitable hardware and/or software that can modify a list of trusted callers. In various embodiments, the trusted caller management module 310 is configured to add and/or subtract trusted callers to a list of trusted callers. The trusted caller management module 310 can add and/or subtract trusted callers to/from a list of trusted callers in response to receiving commands from the user of the user computing device 104 instructing/commanding the trusted caller management module 310 to add and/or subtract trusted callers to/from the list of trusted callers.

A reset module 312 may include any suitable hardware and/or software that can perform one or more reset operations and/or functions. In various embodiments, the reset module 312 is configured to regenerate a list of trusted callers in the memory device(s) 210. The list of trusted callers can be regenerated by the reset module 312 in response to the reset module 312 receiving commands from the user of the user computing device 104 instructing/commanding the reset module 312 to regenerate a list of trusted callers in the memory device(s) 210.

Referring back to FIGS. 2A and 2B, a processor 212 may include any suitable non-volatile/persistent hardware and/or software configured to perform and/or facilitate performing functions and/or operations for managing video filters. In various embodiments, the processor 212 includes hardware and/or software for executing instructions in one or more modules and/or applications that can perform and/or facilitate performing functions and/or operations for automatically answering communication sessions received from trusted callers. The modules and/or applications executed by the processor 212 for automatically answering communication sessions received from trusted callers can be stored on and executed from a memory device 210 and/or from the processor 212.

Figure 4A:
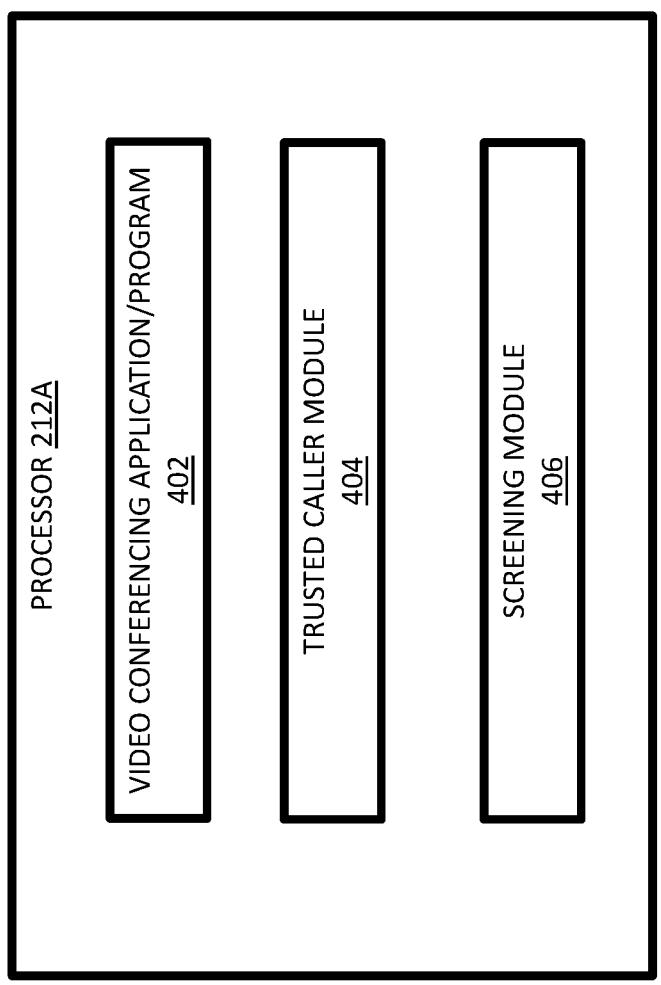
FIGS. 4A and 4B are schematic block diagrams illustrating various embodiments of a processor included in the user computing devices of FIGS. 2A and 2B.

With reference to FIG. 4A, FIG. 4A is a schematic block diagram of one embodiment of a processor 212A. At least in the illustrated embodiment, the processor 212A includes, among other components, a video conference program/application 402, a trusted caller module 404, and a screening module 406 similar to the video conference program/application 302, trusted caller module 304, and screening module 306 in the memory device 210A discussed with reference with FIG. 3A.

Figure 4B:
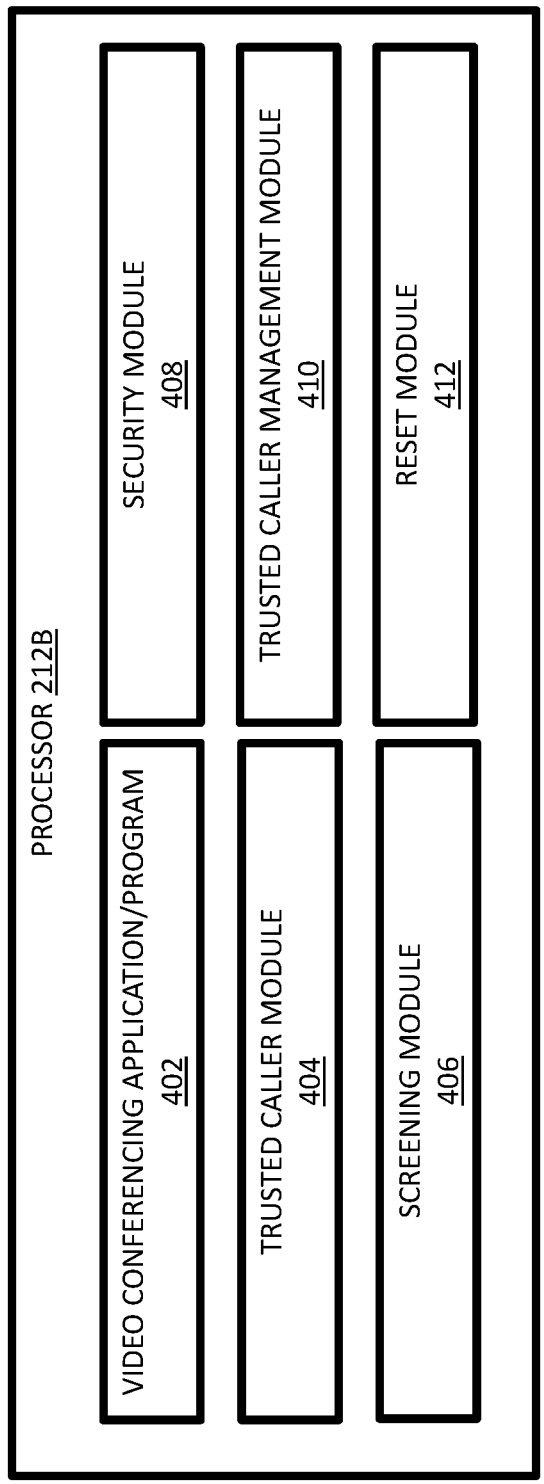

Referring to FIG. 4B, FIG. 4B is a schematic block diagram of another embodiment of a processor 212B. At least in the illustrated embodiment, the processor 212B includes, among other components, a video conference program/application 402, a trusted caller module 404, a screening module 406, a security module 408, a trusted caller management module 410, and a reset module 412 similar to the video conference program/application 302, trusted caller module 304, screening module 306, security module 308, trusted caller management module 310, and reset module 312 in the memory device 210B discussed with reference with FIG. 3B.

With reference again to FIG. 1B, an external computing device 108 may include any suitable computer hardware and/or software that can store and exchange data with the user computing device 104. In various embodiments, an external computing device 108 can include one or more processors, computer-readable memory, and/or one or more interfaces, among other features and/or hardware. An external computing device 108 can further include any suitable software component or module, or computing device(s) that is/are capable of hosting and/or serving a software application or services, including distributed, enterprise, and/or cloud-based software applications, data, and services. For instance, an external computing device 108 can be configured to store or otherwise maintain/manage a list of trusted callers. In some instances, an external computing device 108 can be implemented as some combination of devices that can comprise a common computing system and/or device, server, server pool, or cloud computing environment and share computing resources, including shared memory, processors, and interfaces.

Figure 5A:
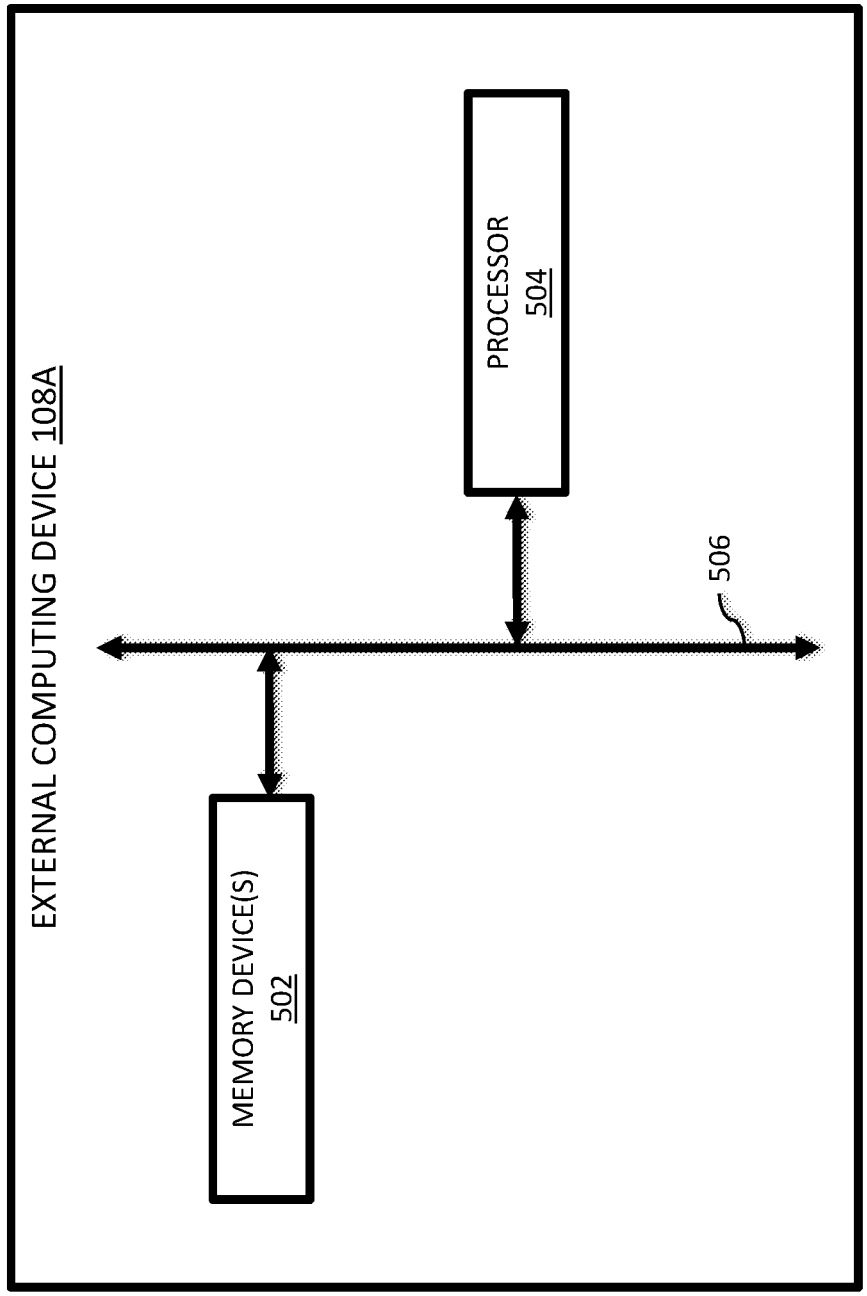
FIGS. 5A and 5B are schematic block diagrams illustrating various embodiments of an external computing device included in the systems of FIGS. 1A and 1B.

With reference to FIG. 5A, FIG. 5A is a block diagram of one embodiment of an external computing device 108A. At least in the illustrated embodiment, the external computing device 108A includes, among other components, a set of one or more memory devices 502 and a processor 504 coupled to and/or in communication with one another via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer storage media. For example, a memory device 502 may include RAM, including DRAM, SDRAM, and/or SRAM. In other embodiments, a memory device 502 includes non-volatile computer storage media. For example, a memory device 502 may include a hard disk drive, a flash memory, and/or any other suitable non-volatile computer storage device that is known or developed in the future. In various embodiments, a memory device 502 includes both volatile and non-volatile computer storage media.

Figure 5B:
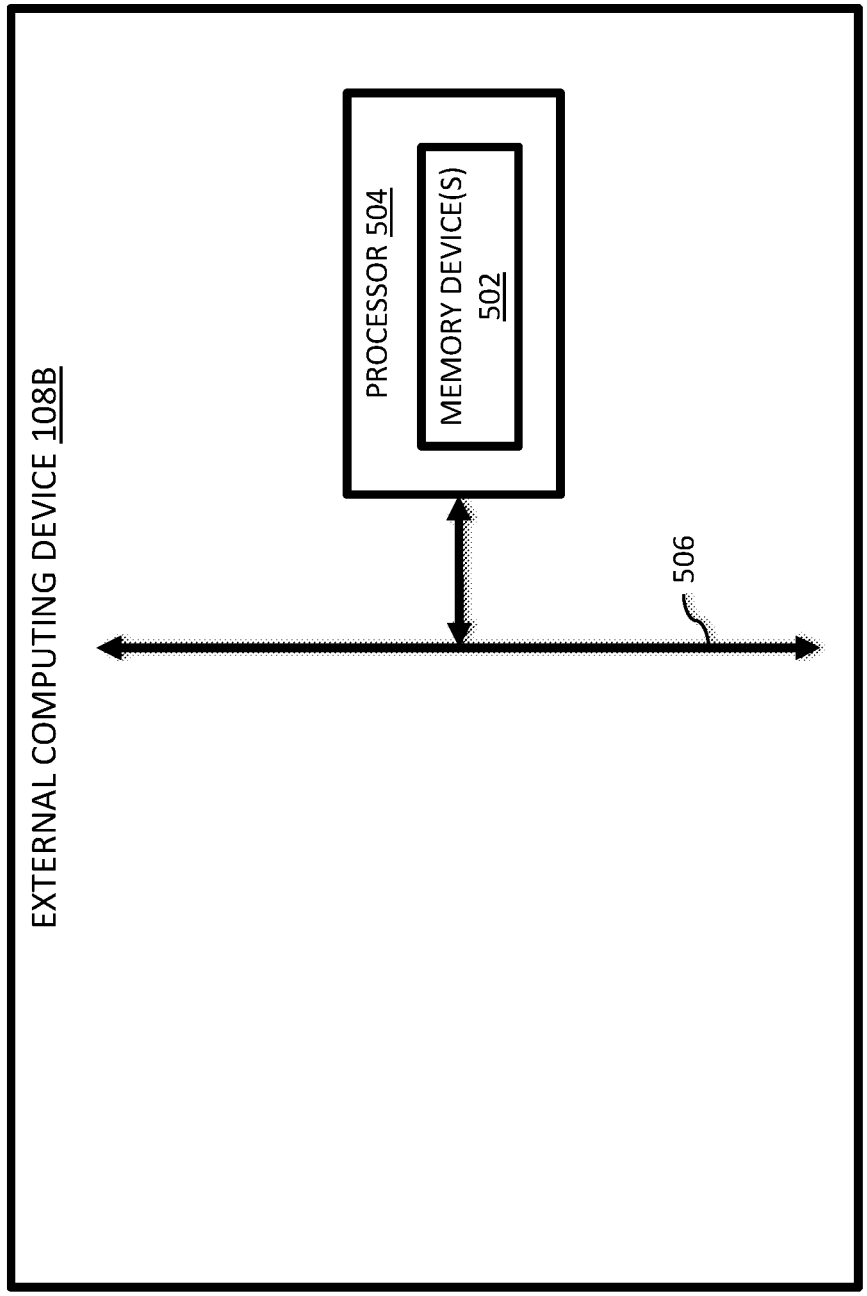

Referring to FIG. 5B, FIG. 5B is a block diagram of another embodiment of an external computing device 108B. The external computing device 108B includes, among other components, a memory 502 and a processor 504. Alternative to the external computing device 108A, the processor 502 in the external computing device 108B includes the memory device 502 as opposed to the memory device 502 of the external computing device 108A being a different device than and/or independent of the processor 504.

Figure 6:
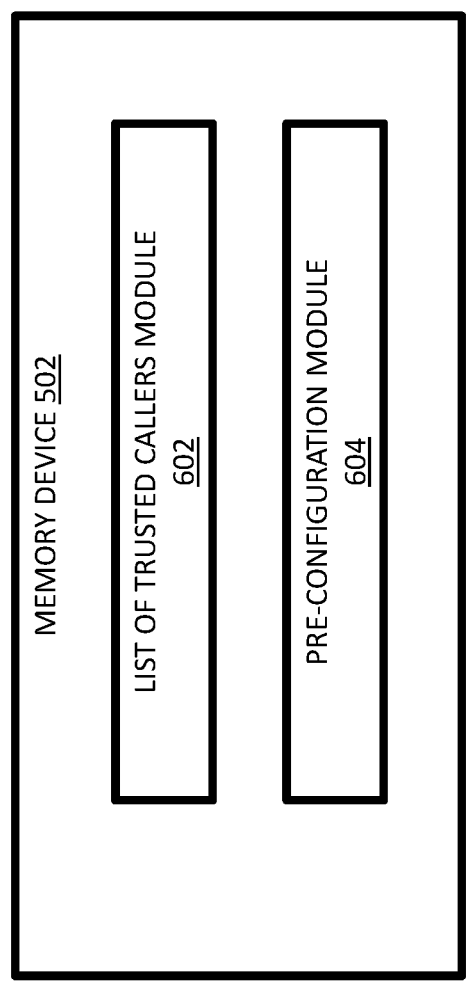
FIG. 6 is schematic block diagram illustrating one embodiment of a memory device included in the external computing devices of FIGS. 5A and 5B.

With reference now to FIG. 6, FIG. 6 is a schematic block diagram of one embodiment of a memory device 502. At least in the illustrated embodiment, the memory device 502 includes, among other components, a list of trusted caller module 602 and a pre-configuration module 604 that are each configured to operate/function in conjunction with one another and the user computing device 104.

A list of trusted caller module 602 may include any suitable hardware and/or software capable of storing a list of trusted callers. In some embodiments, the list of trusted callers is signed with a digital certificate associated with a user computing device 104 and/or a user of the user computing device 104. In additional or alternative embodiments, the list of trusted callers is encrypted, as discussed elsewhere herein.

In various embodiments, the list trusted callers is maintained by the list of trusted caller module 602. In some embodiments, after verification of the user computing device 104 and/or a user of the user computing device 104, the list of trusted caller module 602 is configured to provide the list of trusted callers to the user computing device 104 and/or provide access to the list of trusted callers to the user computing device 104 in response to receiving requests from the trusted caller module 304, screening module 306, security module 308, trusted caller list management module 310, and/or reset module 312. The list of trusted callers may be provided to and/or used by the trusted caller module 304, screening module 306, security module 308, trusted caller list management module 310, and/or reset module 312 in performing their various respective operations, as discussed elsewhere herein.

A pre-configuration module 604 may include any suitable hardware and/or software that can facilitate providing a manual pre-configuration process on a user computing device 104. As discussed above in certain embodiments, a list of trusted callers is not pre-encoded in the memory device(s) 210 of a user computing device 104. As such, a manual pre-configuration process is to be performed by a user so that the list of trusted callers can be transmit to the user computing device 104 from the external computing device 108 and stored in the memory device(s) 210.

As part of the PKI protocol, the list of trusted callers on the external computing device 108 is signed with a digital certificate associated with a user computing device 104 and/or a user of the user computing device 104. In various embodiments, the pre-configuration module 604 is configured to receive, from the user computing device 104, a request for a read file that includes the list of trusted callers. The request includes a cryptographic key. The pre-configuration module 604 is configured to verify the user computing device 104 and/or a user of the suer computing device 104 by comparing the received cryptographic key and the digital signature to determine a match.

In response to a match, the user computing device 104 and/or a user of the user computing device 104 is verified and the pre-configuration module 604 is configured to transmit the list of trusted callers to the user computing device 104. In some embodiments, the transmitted list of trusted callers is encrypted, as discussed elsewhere herein. In response to a non-match, the user computing device 104 and/or a user of the user computing device 104 is not verified and the pre-configuration module 604 is configured to not transmit the list of trusted callers to the user computing device 104.

Figure 7:
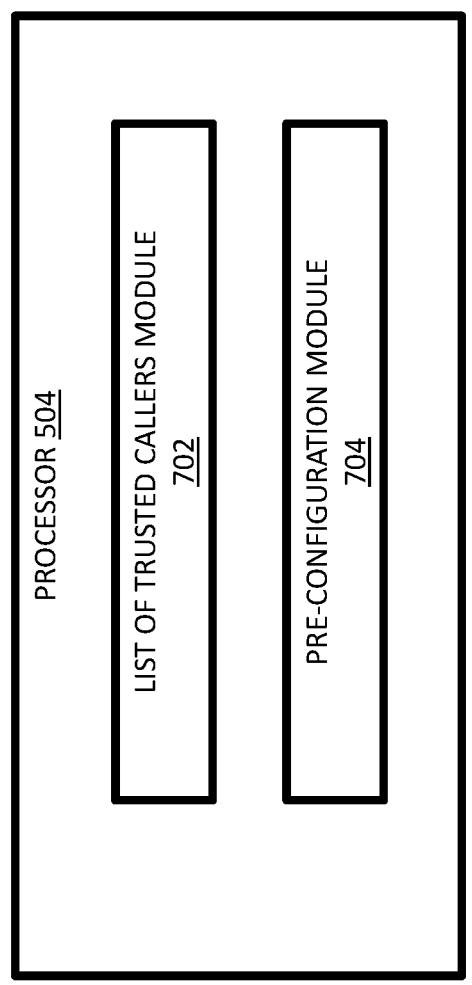
FIG. 7 is schematic block diagram illustrating one embodiment of a processor included in the external computing devices of FIGS. 5A and 5B.

With reference to FIG. 7, FIG. 7 is a schematic block diagram of one embodiment of a processor 504. At least in the illustrated embodiment, the processor 504 includes, among other components, a list of trusted callers module 702 and a pre-configuration module 704 similar to the list of trusted callers module 602 and pre-configuration module 604 in the memory device 502 discussed with reference to FIG. 6.

Figure 8:
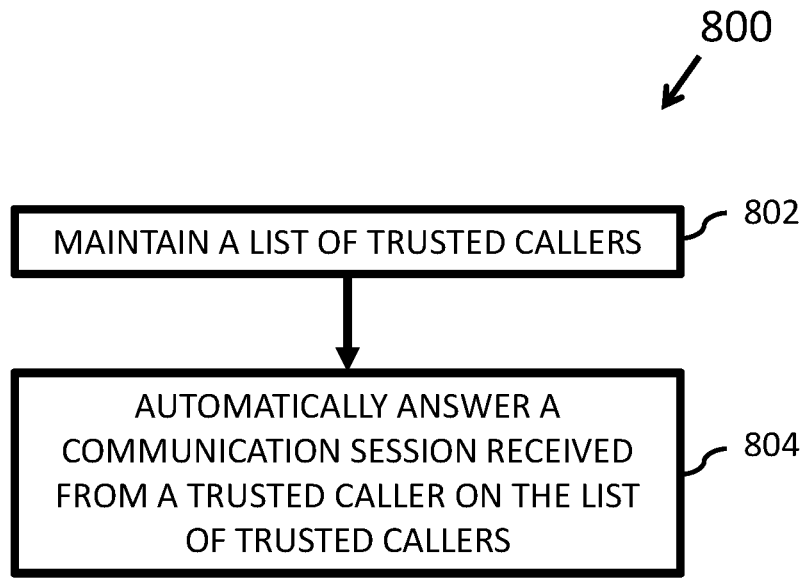
FIG. 8 is a schematic flow chart diagram illustrating one embodiment of a method for automatically answering communication sessions received from trusted callers.

FIG. 8 is a schematic flow chart diagram illustrating one embodiment of a method 800 for automatically answering communication sessions received from trusted callers. At least in the illustrated embodiment, the method 800 begins by a processor (e.g., processor 212) maintaining a list of trusted callers on an information handling device (e.g., a user computing device 104) (block 802). The method 800 further includes automatically answering a communication session received from a trusted caller on the list of trusted callers (block 804).

The communication session may be a video call or an audible call. Further, the trusted caller computing device 106 is a caller computing device 106 and/or a user of a caller computing device 106 that appears on the list of trusted callers, as discussed elsewhere herein.

In some embodiments, the list of trusted callers is pre-encoded in the memory device(s) 210 of the information handling device, as discussed elsewhere herein. In other embodiments, the list of trusted callers is stored in the memory device(s) 210 of the information handling device subsequent to performing a manual pre-configuration process, as discussed elsewhere herein.

Figure 9:
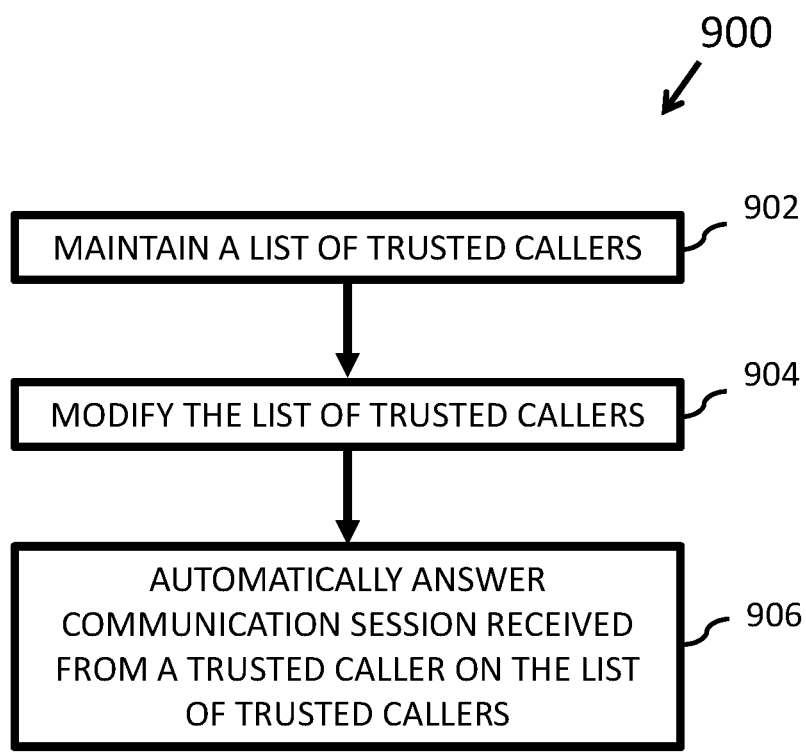
FIG. 9 is a schematic flow chart diagram illustrating another embodiment of a method for automatically answering communication sessions received from trusted callers.

FIG. 9 is a schematic flow chart diagram illustrating another embodiment of a method 900 for automatically answering communication sessions received from trusted callers. At least in the illustrated embodiment, the method 900 begins by a processor (e.g., processor 212) maintaining a list of trusted callers on an information handling device (e.g., a user computing device 104) (block 902).

The method 900 further includes the processor 212 modifying the list of trusted callers (block 904). The processor 212 can modify the list of trusted callers by adding one or more trusted callers to the list of trusted callers and/or subtracting/deleting one or more trusted callers from the list of trusted callers.

In some embodiments, the processor 212 adds the one or more trusted callers to a list of trusted callers and/or subtracts/deletes the one or more trusted callers from the list of trusted callers on a user computing device 104 in response to receiving a command from the user of the user computing device 104. In other embodiments, the processor 212 adds the one or more trusted callers to a list of trusted callers and/or subtracts/deletes the one or more trusted callers from the list of trusted callers on an external computing device 108 in response to receiving a command from the external computing device 108.

The method 900 further includes the processor 212 automatically answering a communication session received from a trusted caller on the list of trusted callers (block 906). The calls can be automatically answered from a trusted caller without the user of the user computing device 104 having to perform any actions and/or operations.

The communication session may be a video call or an audible call. Further, the trusted caller computing device 106 is a caller computing device 106 and/or a user of a caller computing device 106 that appears on the list of trusted callers, as discussed elsewhere herein.

In some embodiments, the list of trusted callers is pre-encoded in the memory device(s) 210 of the information handling device, as discussed elsewhere herein. In other embodiments, the list of trusted callers is stored in the memory device(s) 210 of the information handling device subsequent to performing a manual pre-configuration process, as discussed elsewhere herein.

Figure 10:
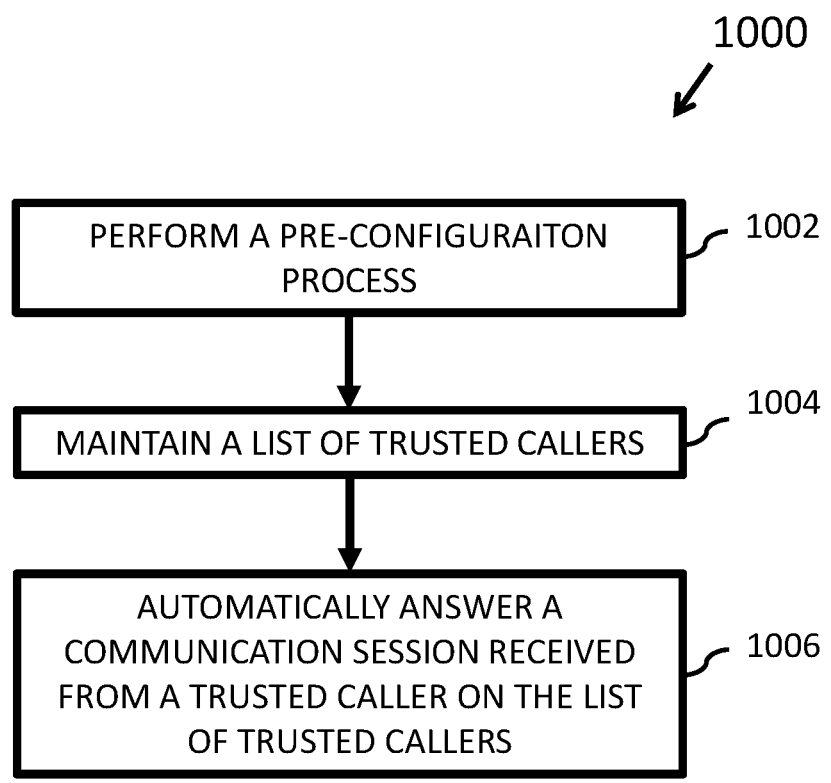
FIG. 10 is a schematic flow chart diagram illustrating yet another embodiment of a method for automatically answering communication sessions received from trusted callers.

FIG. 10 is a schematic flow chart diagram illustrating yet another embodiment of a method 1000 for automatically answering communication sessions received from trusted callers. At least in the illustrated embodiment, the method 1000 begins by a processor (e.g., processor 212) performing a pre-configuration process to access a list of trusted callers (block 1002).

The processor 212 maintains the list of trusted callers on an information handling device (e.g., a user computing device 104) (block 1004). The method 1000 further includes automatically answering a communication session received from a trusted caller computing device 106 (block 1006).

The communication session may be a video call or an audible call. Further, the trusted caller computing device 106 is a caller computing device 106 and/or a user of a caller computing device 106 that appears on the list of trusted callers, as discussed elsewhere herein.

Figure 11:
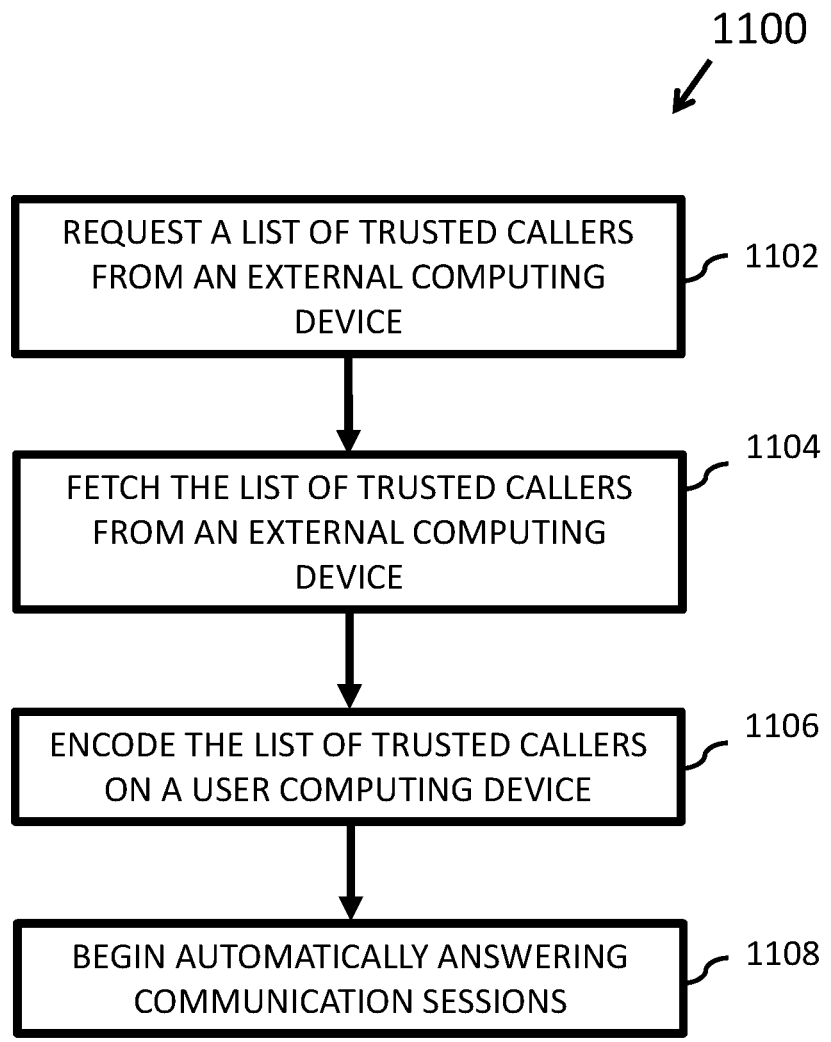
FIG. 11 is a schematic flow chart diagram illustrating one embodiment of a method for a manual pre-configuration process included in the method of FIG. 10.

FIG. 11 is a schematic flow chart diagram illustrating one embodiment of a method 1100 for performing a manual pre-configuration process as part of the method 1000 for automatically answering communication sessions received from trusted callers. At least in the illustrated embodiment, the method 1100 begins by a processor (e.g., processor 212) transmitting a request to an external computing device 108 to retrieve a list of trusted callers (block 1102).

The processor 212 fetches the list of trusted callers from the external computing device 108 (block 1104) and encodes the list of trusted callers in one or more memory device(s) 210 (block 1106). The processor 212 can then begin automatically answering communication sessions received from a trusted caller computing device (block 1108).

The communication session may be a video call or an audible call. Further, the trusted caller computing device 106 is a caller computing device 106 and/or a user of a caller computing device 106 that appears on the list of trusted callers, as discussed elsewhere herein.

Figure 12:
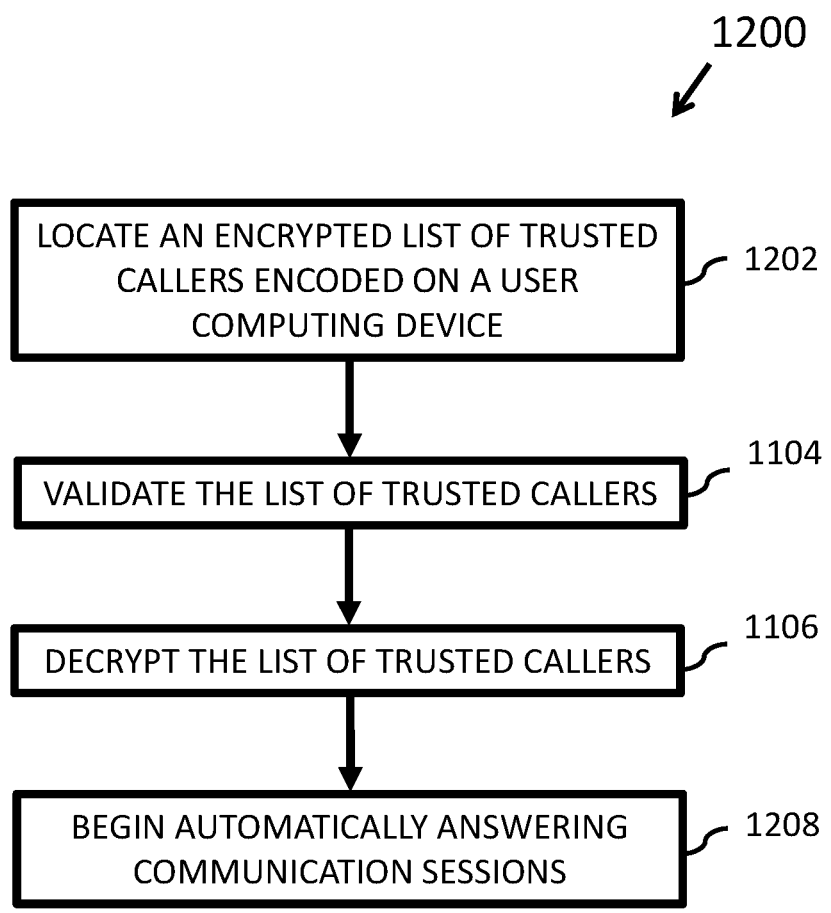
FIG. 12 is a schematic flow chart diagram illustrating one embodiment of a method for an automatic pre-configuration process included in the method of FIG. 10.

FIG. 12 is a schematic flow chart diagram illustrating one embodiment of a method 1200 for performing an automatic pre-configuration process as part of the method 1000 for automatically answering communication sessions received from trusted callers. At least in the illustrated embodiment, the method 1200 begins by a processor (e.g., processor 212) locating an encrypted listed of trusted callers encoded on the memory device(s) 210 of an information handling device (block 1202).

The encrypted listed of trusted callers encoded on the memory device(s) 210 are validated (block 1204) and decrypted (block 1206) by the processor 212. The encrypted listed of trusted callers encoded on the memory device(s) 210 may be validated and decrypted by the processor 212 in accordance with any of the embodiments of the user computing device 104 discussed herein. The processor 212 can then begin automatically answering communication sessions received from a trusted caller computing device (block 1208).

The communication session may be a video call or an audible call. Further, the trusted caller computing device 106 is a caller computing device 106 and/or a user of a caller computing device 106 that appears on the list of trusted callers, as discussed elsewhere herein.

Figure 13:
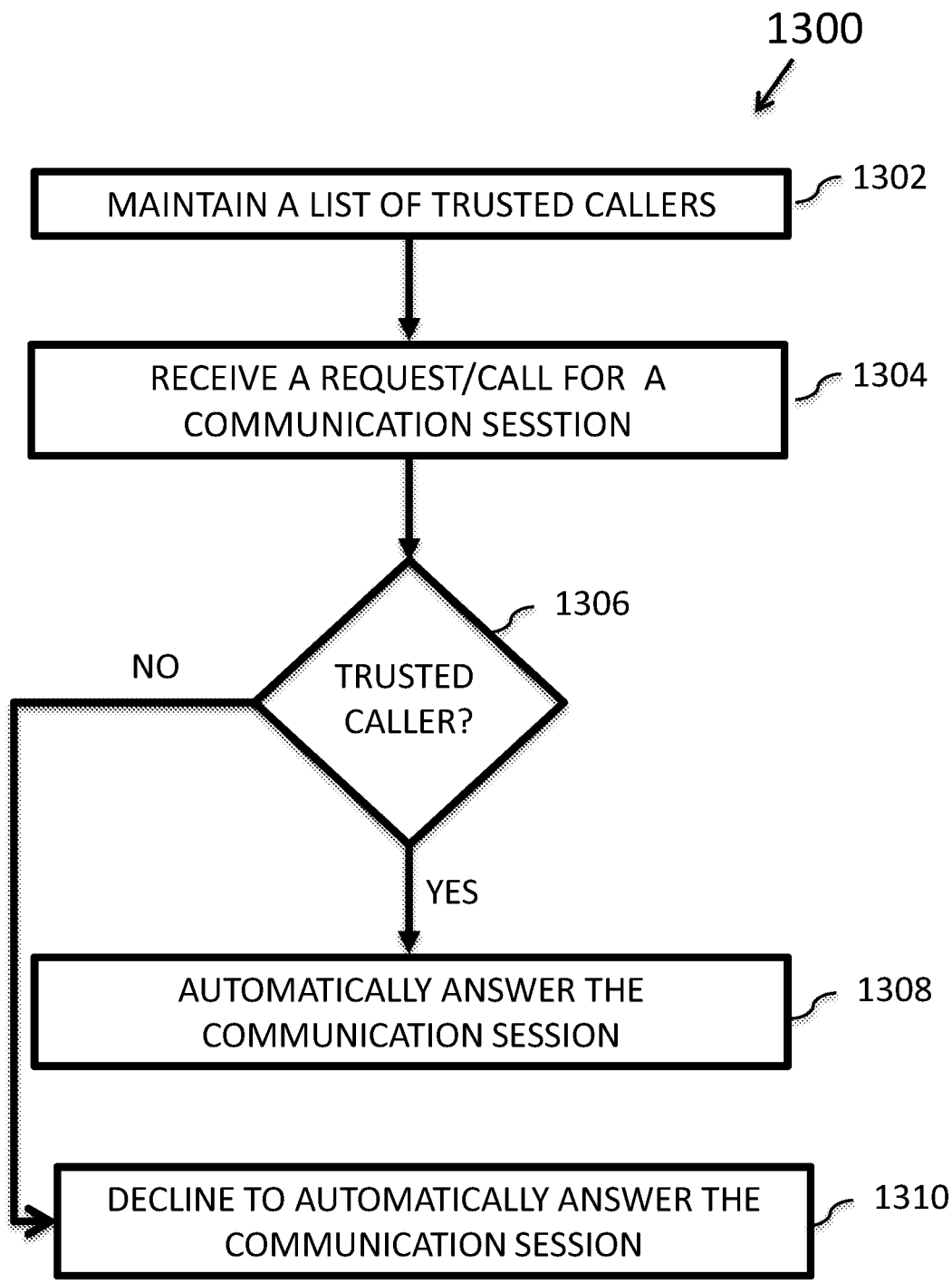
FIG. 13 is a schematic flow chart diagram illustrating another embodiment of a method for automatically answering communication sessions received from trusted callers.

FIG. 13 is a schematic flow chart diagram illustrating another embodiment of a method 1300 for automatically answering communication sessions received from trusted callers. At least in the illustrated embodiment, the method 1300 begins by a processor (e.g., processor 212) maintaining a list of trusted callers on an information handling device (e.g., a user computing device 104) (block 1302).

The method 1300 further includes the processor 212 receiving a request for a communication session (e.g., a video call or an audible call) from a caller computing device 106 (block 1304). The processor determines whether the caller computing device 106 is a trusted caller (e.g., a caller computing device 106 that appears on the list of trusted callers (e.g., a trusted caller device 106) and/or a user of the caller computing device 106 is a user on the listed of trusted callers (e.g., a trusted caller)) (block 1306).

In response to the caller computing device 106 being a trusted caller device 106 (e.g., a "YES" in block 1306), the processor 212 automatically answers the call (block 1208). The processor 212 automatically answers the call without the user of the information handling device (e.g., user computing device 104) having to do anything and/or accept the call.

In response to the caller computing device 106 not being a trusted caller device 106 (e.g., a "NO" in block 1306), the processor 212 declines to automatically answer the call (block 1310). In some embodiments, declining to automatically answer the call includes automatically rejecting the call. In other embodiments, declining to automatically answer the call includes enabling/allowing the user of the information handling device to manually answer the call (e.g., via notifying the user of the call and receiving an accept input or reject input).

In some embodiments, the list of trusted callers is pre-encoded in the memory device(s) 210 of the information handling device, as discussed elsewhere herein. In other embodiments, the list of trusted callers is stored in the memory device(s) 210 of the information handling device subsequent to performing a manual pre-configuration process, as discussed elsewhere herein.

The various embodiments disclosed herein can enable a communication session (e.g., a video call or audio call) to be automatically accepted and/or answered. Specifically, once a user computing device 104 finds and validates (and optionally decrypts) a list of trusted callers, the user computing device 104 can be manually or automatically set up to automatically receive calls from a caller computing device 106 and/or a user of a caller computing device 106 that appears on the list of trusted callers. The calls can be automatically answered from a trusted caller without the user of the user computing device 104 having to perform any actions and/or operations.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory configured to store code executable by the processor to:
   maintain a list of trusted callers that is encoded in the memory, the list of trusted callers including fully trusted callers and less trusted callers, in response to receiving a communication session from a caller, determine whether the caller is included in the list of trusted callers, in response to determining that the caller is included in the list of trusted callers:

automatically answer a first communication session received from a fully trusted caller in the encoded list of trusted callers without receiving input from a user accepting the first communication session, and semi-automatically answer a second communication session received from a less trusted caller in the encoded list of trusted callers by forwarding the second communication session to a user to enable the user to manually accept or reject the second communication session, and in response to determining that the caller is not included in the list of trusted callers:

determine whether the caller is included in a log of previously accepted communication sessions, semi-automatically answer a third communication session received from a caller included in the log of previously accepted communication sessions by forwarding the third communication session to a user to enable the user to manually accept or reject the third communication session, and automatically decline a fourth communication session received from the caller not included in the log of previously accepted communication sessions without receiving input from the user declining the fourth communication session, wherein encoding the list of trusted callers in the memory protects the encoded list of trusted callers from being modified by an unauthorized third party.

2. The apparatus of claim 1, wherein:

the list of trusted callers is encoded in the apparatus prior to an initial use; and the encoded list of trusted callers is encrypted in the apparatus prior to the initial use.

3. The apparatus of claim 2, wherein:

a key file for decrypting the encrypted encoded list of trusted callers is stored in the apparatus prior to the initial use; and during the initial use, the executable code further causes the processor to:

locate the encrypted encoded list of trusted callers,
validate the encrypted encoded list of trusted callers,
decrypt the encrypted encoded list of trusted callers via the key file, and begin automatically answering communication sessions received from the trusted callers in the list of trusted callers without input from the user accepting the communication sessions, wherein the encrypted encoded list of trusted callers is cryptographically associated with the apparatus via at least one of a serial number, a firmware hash, or a unique digital signature of the apparatus.

4. The apparatus of claim 1, wherein, during the initial use, the executable code further causes the processor to:

fetch, via encrypted transmission, an encrypted list of trusted callers from an external device;

decrypt the encrypted list of trusted callers via an encryption key in the apparatus; and begin automatically answering communication sessions received from the trusted callers in the list of trusted callers without receiving input from the user accepting the communication sessions, wherein the encrypted list of trusted callers is cryptographically associated with the apparatus.

5. The apparatus of claim 1, wherein the executable code further causes the processor to:

receive one or more add commands to add a first trusted caller to the encoded list of trusted callers;

receive one or more remove commands to remove a second trusted caller from the encoded list of trusted callers;

add the first trusted caller to the encoded list of trusted callers in response to receiving each add command; and remove the second trusted caller from the encoded list of trusted callers in response to receiving each remove command.

6. The apparatus of claim 5, wherein the one or more add commands and/or the one or more remove commands are received from the user.

7. The apparatus of claim 5, wherein the one or more add commands and/or the one or more remove commands are received from an external entity.

8. The apparatus of claim 5, wherein the executable code further causes the processor to:

receive a reset command from the user; and regenerate the encoded list of trusted callers in response to receiving the reset command from the user.

9. A method, comprising:

maintaining, by a processor of an information handling device, a list of trusted callers encoded in a memory, the list of trusted callers including fully trusted callers and less trusted callers;

in response to receiving a communication session from a caller, determining whether the caller is included in the list of trusted callers;

in response to determining that the caller is included in the list of trusted callers:

automatically answering a first communication session received by the information handling device from a fully trusted caller in the encoded list of trusted callers without receiving input from a user of the information handling device accepting the first communication session on the information handling device, and semi-automatically answering a second communication session received from a less trusted caller in the encoded list of trusted callers by forwarding the second communication session to a user to enable the user to manually accept or reject the second communication session; and in response to determining that the caller is not included in the list of trusted callers:

determining whether the caller is included in a log of previously accepted communication sessions, semi-automatically answering a third communication session received from a caller included in the log of previously accepted communication sessions by forwarding the third communication session to a user to enable the user to manually accept or reject the third communication session, and automatically declining a fourth communication session received from the caller not included in the log of previously accepted communication sessions without receiving input from the user declining the fourth communication session, wherein encoding the list of trusted callers in the memory protects the encoded list of trusted callers from being modified by an unauthorized third party.

10. The method of claim 9, wherein:
the list of trusted callers is encoded in the apparatus prior to an initial use; and
the encoded list of trusted callers is encrypted in the apparatus prior to the initial use.

11. The method of claim 10, wherein:
a key file for decrypting the encrypted encoded list of trusted callers is stored in the apparatus prior to the initial use; and
the method, during the initial use, further comprises:
locating the encrypted encoded list of trusted callers,
validating the encrypted encoded list of trusted callers,
decrypting the encrypted encoded list of trusted callers via the key file, and
beginning automatically answer communication sessions received from the trusted callers in the list of trusted callers without input from the user accepting the communication sessions,
wherein the encrypted encoded list of trusted callers is cryptographically associated with the apparatus via at least one of a serial number, a firmware hash, or a unique digital signature of the apparatus.

12. The method of claim 9, wherein the method, during the initial use, further comprises:
fetching, via encrypted transmission, an encrypted list of trusted callers from an external device;
decrypting the encrypted list of trusted callers via an encryption key in the apparatus; and
beginning automatically answering communication sessions received from the trusted callers in the list of trusted callers without receiving input from the user accepting the communication sessions,
wherein the encrypted list of trusted callers is cryptographically associated with the apparatus.

13. The method of claim 9, wherein the method further comprises:
receiving one or more add commands to add a first trusted caller to the encoded list of trusted callers;
receiving one or more remove commands to remove a second trusted caller from the encoded list of trusted callers;
adding the first trusted caller to the encoded list of trusted callers in response to receiving each add command; and
removing the second trusted caller from the encoded list of trusted callers in response to receiving each remove command.

14. The method of claim 13, wherein the one or more add commands and the one or more remove commands are received from one of the user and an external entity.

15. The method of claim 13, wherein the method further comprises:
receiving a reset command from the user; and
regenerating the encoded list of trusted callers in response to receiving the reset command from the user.

16. A computer program product comprising a computer-readable storage medium including code embodied therewith, the code executable by a processor to cause the processor to:
maintain a list of trusted callers that are encoded in a memory of an information handling device, the list of trusted callers including fully trusted callers and less trusted callers;
in response to receiving a communication session from a caller, determine whether the caller is included in the list of trusted callers;
in response to determining that the caller is included in the list of trusted callers:
automatically answer a first communication session received by the information handling device from a fully trusted caller in the encoded list of trusted callers without receiving input from a user of the information handling device accepting the communication session on the information handling device, and
semi-automatically answer a second communication session received by the information handling device from a less trusted caller in the encoded list of trusted callers by forwarding the second communication session to a user to enable the user to manually accept or reject the second communication session; and
in response to determining that the caller is not included in the list of trusted callers:
determine whether the caller is included in a log of previously accepted communication sessions,
semi-automatically answer a third communication session received from a caller included in the log of previously accepted communication sessions by forwarding the third communication session to a user to enable the user to manually accept or reject the third communication session, and
automatically reject a fourth communication session received from the caller not included in the log of previously accepted communication sessions without receiving input from the user rejecting the fourth communication session,
wherein encoding the list of trusted callers in the memory protects the encoded list of trusted callers from being modified by an unauthorized third party.

17. The computer program product of claim 16, wherein the code further causes the processor to:
receive one or more add commands to add a first trusted caller to the encoded list of trusted callers;
receive one or more remove commands to remove a second trusted caller from the encoded list of trusted callers;
add the first trusted caller to the encoded list of trusted callers in response to receiving each add command; and
remove the second trusted caller from the encoded list of trusted callers in response to receiving each remove command.

18. The computer program product of claim 17, wherein the one or more add commands and/or the one or more remove commands are received from the user.

19. The computer program product of claim 17, wherein the one or more add commands and/or the one or more remove commands are received from an external entity.

20. The computer program product of claim 17, wherein the code further causes the processor to:
receive a reset command from the user; and
regenerate the encoded list of trusted callers in response to receiving the reset command from the user.

* * * * *